United States Patent
Van Riel et al.

(10) Patent No.: US 11,067,597 B2
(45) Date of Patent: Jul. 20, 2021

(54) METHOD OF PERFORMING ATOMIC FORCE MICROSCOPY WITH AN ULTRASOUND TRANSDUCER

(71) Applicant: Nederlandse Organisatie voor toegepast-natuurwetenschappelijk onderzoek TNO, The Hague (NL)

(72) Inventors: Martinus Cornelius Johannes Maria Van Riel, s-Gravenzande (NL); Paul Louis Maria Joseph Van Neer, Bergschenhoek (NL); Hamed Sadeghian Marnani, Nootdorp (NL); Maarten Hubertus Van Es, Voorschoten (NL)

(73) Assignee: NEDERLANDSE ORGANISATIE VOOR TOEGEPAST-NATUURWETENSCHAPPELIJK ONDERZOEK TNO, The Hague (NL)

( * ) Notice: Subject to any disclaimer, the term of this patent is extended or adjusted under 35 U.S.C. 154(b) by 0 days.

(21) Appl. No.: 16/760,687

(22) PCT Filed: Nov. 2, 2018

(86) PCT No.: PCT/NL2018/050735
§ 371 (c)(1),
(2) Date: Apr. 30, 2020

(87) PCT Pub. No.: WO2019/088841
PCT Pub. Date: May 9, 2019

(65) Prior Publication Data
US 2020/0348334 A1 Nov. 5, 2020

(30) Foreign Application Priority Data
Nov. 3, 2017 (EP) .................................... 17200014

(51) Int. Cl.
*G01Q 30/14* (2010.01)
*G01Q 60/32* (2010.01)

(52) U.S. Cl.
CPC ............. *G01Q 30/14* (2013.01); *G01Q 60/32* (2013.01)

(58) Field of Classification Search
CPC ........ G01Q 30/14; G01Q 60/32; G01Q 30/10; G01N 2291/2697; G01N 29/0681; G01N 29/28; G01N 29/2437; G01N 29/346
See application file for complete search history.

(56) References Cited

U.S. PATENT DOCUMENTS

| 5,654,546 A * | 8/1997 | Lindsay | G01Q 30/10 |
| | | | 850/9 |
| 5,675,075 A * | 10/1997 | Arnold | G01H 3/125 |
| | | | 73/105 |

(Continued)

FOREIGN PATENT DOCUMENTS

| EP | 2219036 A1 | 8/2010 |
| EP | 3349002 A1 | 7/2018 |

(Continued)

OTHER PUBLICATIONS

Hu et al., "Imaging of Subsurface Structures Using Atomic Force Acoustic Microscopy at GHz Frequencies", Journal of Applied Physics, vol. 109, pp. 1-6; 2011.

*Primary Examiner* — Brooke Purinton
(74) *Attorney, Agent, or Firm* — Hoffmann & Baron, LLP (57) ABSTRACT

A method of performing atomic force microscopy (AFM) measurements, uses an ultrasound transducer to transmit modulated ultrasound waves with a frequency above one GHz from the ultrasound transducer to a top surface of a sample through the sample from the bottom surface of the sample. Effects of ultrasound wave scattering are detected from vibrations of an AFM cantilever at the top surface of (Continued)

the sample. Before the start of the measurements, a drop of a liquid is placed on a top surface of the ultrasound transducer. The sample is placed on the top surface of the ultrasound transducer, whereby the sample presses the liquid in the drop into a layer of the liquid between the top surface of the ultrasound transducer and a bottom surface of the sample. The AFM measurements are started after a thickness of the layer of the liquid has stabilized.

18 Claims, 3 Drawing Sheets

(56) References Cited

U.S. PATENT DOCUMENTS

| | | | |
|---|---|---|---|
| 2004/0020279 A1* | 2/2004 | Degertekin | G01N 29/2456 73/105 |
| 2004/0152355 A1* | 8/2004 | Rudy | H01R 4/4836 439/438 |
| 2006/0037401 A1* | 2/2006 | Shekhawat | G01N 29/0681 73/603 |
| 2008/0092659 A1* | 4/2008 | Flores | G01N 29/0618 73/618 |
| 2008/0276695 A1* | 11/2008 | Prater | G01N 29/0681 73/105 |
| 2011/0296563 A1* | 12/2011 | Striegler | G01Q 60/32 850/33 |
| 2011/0296565 A1* | 12/2011 | Bykov | B82Y 35/00 850/53 |

FOREIGN PATENT DOCUMENTS

| | | |
|---|---|---|
| EP | 3349020 A1 | 7/2018 |
| EP | 3385725 A1 | 10/2018 |
| WO | 2008141301 A1 | 11/2008 |
| WO | 2010085948 A1 | 8/2010 |

* cited by examiner

METHOD OF PERFORMING ATOMIC FORCE MICROSCOPY WITH AN ULTRASOUND TRANSDUCER

This application claims priority from International Application No. PCT/NL2018/050735, filed on Nov. 2, 2018, which claims priority from European patent application numbers EP 17200014.3, filed on Nov. 3, 2017, both of which are incorporated herein in their entirety.

FIELD OF THE INVENTION

The invention relates to atomic force microscopy (AFM) wherein acoustic waves are used to obtain images of subsurface structures (buried structures) in a sample such as a semi-conductor device.

BACKGROUND

AFM is normally used to obtain images of sample surfaces. Shuiqing Hu, et al describe its use to obtain images subsurface structures (buried structures), without removing the surface, in an article titled "Imaging of subsurface structures using atomic force acoustic microscopy at GHz Frequencies", published in the Journal of Applied Physics 109, 084324 (2011).

Figure 1:
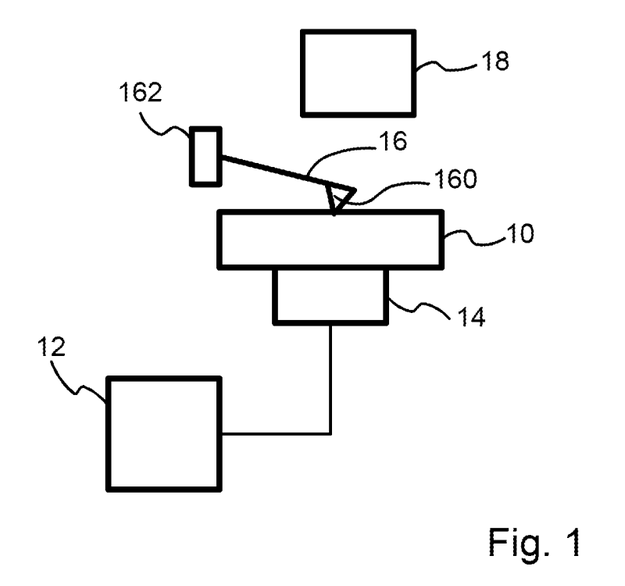
FIG. 1 shows a prior art AFM measuring system

FIG. 1 shows an AFM measuring system for use in such measurements, comprising a sample 10 on top of an ultrasound transducer 14, with an AFM cantilever 16 at the top surface of sample 10, and a detector 18 for sensing bending of the cantilever 16. The measurements involve transmitting amplitude modulated, high frequency ultrasound waves from ultrasound transducer 14 through the sample to the sample surface on which the AFM probe senses forces. Shuiqing Hu uses an ultrasound frequency of about 1 GHz. Such waves travel to the AFM probe through the subsurface structures. Shuiqing Hu uses frequency near 1 GHz and cantilever contact resonance to increase the observable contrast.

AFM sensing of this type makes use of non-linearity mixing at the contact between the probe tip and the sample surface. The non-linear vibration signal mixing at the AFM probe tip gives rise to a vibration component of the AFM probe with the modulation frequency. At high ultrasound frequencies the cantilever behaves as a stiff object, which allows from large deformations of the sample. The amplitude of these deformations depends on the stiffness of the sample surface, which in turn depends on the presence of buried structures close to the surface as well as other surface stiffness inhomogeneity.

When the distance between the surface and the buried structures increases, the effect of the buried structures on the stiffness diminishes, making it more difficult to distinguish the effect of the buried structures on the surface. However, buried structures may also result in ultrasound wave scattering, which affect the position dependence along the substrate surface of the ultrasound wave excitation. The size of this effect increases with increasing ultrasound frequency (typically with the square of the ultrasound frequency). Increasing the ultrasound frequency in the Ghz range makes it possible to detect the effect of scattering and provides for deeper imaging. However, it has been found that it is hard to obtain reproducible measurements in the GHz range.

WO2010085948 discloses a coupling device for a raster force microscope. The device contains a sound generator below the sample. A water basin is formed around the top of the sound generator. The sample rests on columns outside the basin, with the bottom of the sample about 0.1 to 0.5 mm above a height of a sealing ring on the top of the side wall of the basin. As described this has the effect that, when the basin is filled, the bottom of the sample and the sealing ring are coupled by an adhesion force that allows for lateral translation of the sample. In turn, the top surface of the sound generator is lower than the top surface of the sealing ring, so that a water filled space is created between the top of the sound generator and the bottom of the sample when the basin is full. This is used to realize a constant excitation.

EP2219036 discloses a microscope with a basin that enables measurements on samples in a liquid or electrochemical environment.

EP2219036 discloses an AFM microscope wherein the sample rests on sample holder that is located on a translation stage. Underneath the sample holder is an internal cavity with an ultrasonic transducer for generating an ultrasonic wave. The ultrasonic wave is coupled into the backside of sample via the sample holder, preferably via a liquid interface such as a drop of ultra pure water between the transducer and the backside of the sample.

SUMMARY

Among others, it is an object to obtain more reproducible information about subsurface structures from AFM measurements of surface response to ultrasound waves.

A method of performing atomic force microscopy (AFM) measurements is provided, the method comprising
  providing an ultrasound transducer;
  placing a drop of a liquid on a top surface of the ultrasound transducer;
  placing a sample on the top surface of the ultrasound transducer, whereby the sample presses the liquid in the drop into a layer of the liquid between the top surface of the ultrasound transducer and a bottom surface of the sample;
  transmitting modulated ultrasound waves, preferably with an ultrasound wave frequency in the GHz range, from the ultrasound transducer to a top surface of the sample through the sample from the bottom surface of the sample to the top surface of the sample;
  performing measurements of vibrations of a cantilever excited by the modulated ultrasound waves while a probe tip on the cantilever is in contact with the top surface of the sample, after a thickness of the layer of the liquid has stabilized.

It has been found that use of a layer of liquid between the top surface of the ultrasound transducer and the bottom surface of the sample makes it possible to obtain more reproducible AFM imaging excited by ultrasound waves with ultrasound wave frequencies in the GHz range. The water layer thickness cannot drop beyond a thickness due to surface roughness of sample and the top surface of ultrasound transducer. Thus, presence of the layer of the liquid surface does not exclude local contacts between the top surface of the ultrasound transducer and the bottom surface of the sample that will usually be present where the surfaces meet due to roughness, when the layer is present outside these local contacts. The thickness of the layer is its average thickness in the space between the transducer and the sample. Preferably the drop of liquid has a volume that corresponds to a layer with a thickness of less than two micrometer, and preferably about one micrometer or less when the drop is spread over the entire contact area of the sample and the ultrasound transducer. It has been found that no more liquid is needed in the drop, whereas use of a greater thickness makes it necessary to use an increased waiting time before the measurements can start.

The thickness of the layer that actually remains present when the measurements are performed may be smaller, due to lateral liquid flow from the space between the sample and the transducer, and variable, due to surface curvature or surface roughness. Preferably, the measurements are performed when local contacts between the top surface of the ultrasound transducer and the bottom surface of the sample are present at due to roughness.

Preferably, the liquid is water but another liquid such as paraffin, alcohol, liquefied wax or mercury may be used. In other embodiments, a gallium-alloy, an adhesive or solder tin may be used.

In an embodiment, the method comprises providing a basin for said liquid, the top surface of the ultrasound transducer being located within the basin, and filling the basin with the liquid after the thickness of the layer of the liquid has stabilized, thereby raising a surface level of the liquid in the basin above the top surface of ultrasound transducer. It has been found that this can be used to increase the time duration during which reproducible measurements can be obtained. Preferably, the surface level of the liquid is kept below the top surface of the sample. In this way interference with the AFM measurements is avoided. The liquid in the basin liquid may be replenished the between successive ones of the measurements, avoiding replenishment during the measurements.

In an embodiment the bottom surface of the sample and the top surface of the ultrasound transducer are clamped against each other at least until the thickness of the layer of the liquid has stabilized, thereby exerting a pressing force on the liquid in the layer of the liquid between the bottom surface of the sample bottom surface and the top surface of the ultrasound transducer. This reduces the waiting time before the measurements can start. Typically, the thickness of the layer of the liquid stabilizes the top surface of the ultrasound transducer and the bottom surface of the sample locally come into contact due to roughness. In different embodiments the clamp may exerts a force via the top surface, the bottom surface and/or the sides of the sample to press the sample onto the transducer. As used herein, the term "clamp" refers to a structure used to produce a clamping force or forces, without necessarily limiting this structure to an individual part that directly exerts the clamping force on the sample.

The clamping may be performed using a clamp that comprises one or more elastic elements such as leaf springs via which a pressing force is exerted onto the top surface of the sample. In another embodiment, one or more active actuators may be used that exert a pressing force onto the top surface of the sample, thus pressing the sample onto the transducer. In another embodiment, a suction clamp may be used, wherein the clamp exerts a force onto the sample by applying a reduced pressure or a vacuum on the bottom side of the sample, thus pulling the sample onto the transducer. In other embodiments an electrostatic clamp may be used that exerts a force onto the sample by applying an electrostatic force between sample bottom surface and transducer top surface, thus pulling the sample onto the transducer. In other embodiments a magnetic clamp may be used that exerts a force onto the sample by applying a magnetic force between sample bottom surface and transducer top surface, thus pulling the sample onto the transducer.

The clamping may be performed by at least one of exerting a pressing force onto the top surface of the sample using at least one spring, applying suction to the bottom surface of the sample, electrostatic clamping, magnetic clamping and electro-wetting, or a combination thereof.

In an embodiment ultrasound reflection measurements are performed using the ultrasound transducer after the sample has been placed on the top surface of the ultrasound transducer, monitoring changes in results of the reflection to and starting the measurements of vibrations of a cantilever upon detection that results of the reflection measurements indicate that the thickness of the layer of the liquid has stabilized. This makes it possible to determine when reproducible measurements can be started.

In an embodiment the temperature of the liquid is lowered below a solidification temperature of the liquid after the thickness of the layer of the liquid has stabilized. This can be used to extend the time during which reproducible measurements can be performed.

Furthermore, an AFM measuring system is provided, comprising
 an ultrasound transducer;
 a basin for a liquid, a top surface of the ultrasound transducer being located within the basin, an upper edge of a wall of the basin lying so high that, when the basin is filled, a surface level of the liquid in the basin lies above the top surface of the ultrasound transducer;
 an AFM cantilever located above the top surface of the ultrasound transducer, for contacting a top surface of a sample between the AFM cantilever and the top surface of the ultrasound transducer;
 a detector configured to detect bending of the AFM cantilever.

The AFM measuring system is provided for samples with a size and/or shape that can be placed on the top surface of the ultrasound transducer without extending beyond the edge of the basin. As a result, in the operational measuring system that comprises the sample and the AFM measuring system per se, the sample will rest on the top surface of the ultrasound transducer with a layer of the liquid present in between, or be pressed against that top surface with that layer in between, rather than that the sample rests on the edge of the basin or another support that is not the top of the ultrasound transducer. Preferably, the sample entirely rests on the top surface of the ultrasound transducer at least partly through a layer of the liquid.

It has been found that use of a liquid between the top surface of the ultrasound transducer and the bottom surface of the sample makes it possible to obtain more reproducible AFM imaging excited by ultrasound waves with ultrasound wave frequencies in the GHz range. Use of a basin of liquid extends the time during which reproducible measurements can be performed.

Preferably, the system comprises clamp to press the sample top elastically towards the top surface of the ultrasound transducer. Preferably, the clamp is configured to be placed in contact with the top surface of the sample and to press the sample top elastically towards the top surface of the ultrasound transducer. Alternatively, a suction clamp or other type of clamp mas be used. In an embodiment, the clamp, and each at least one further clamp if present, comprises a contact body, a lowest part of the contact body having a rounded shape for contact with the sample. This makes it possible to perform AFM measurements without causing damage to the sample.

In an embodiment the clamp comprises a leaf spring and the system comprises a frame to which the leaf spring is connected, the system comprising at least one further clamp comprising a leaf spring connected to the frame, the at least one further clamp also being configured to be placed in contact with the top surface of the sample and to press the sample top elastically towards the top surface of the ultrasound transducer. This facilitates controlled clamping.

In an embodiment the clamp and the at least one further clamp configured that their contact point with the sample can be placed at equal distances to the cantilever, at contact points that lie mirror symmetrically with respect to the cantilever. This minimizes the effect of temperature differences.

Preferably, force exerted by the clamp is not higher than a force at which plastic deformation of the sample starts to occur, and at least so high that a stable situation will be reached within a reasonable time. Preferably, the clamp is configured to exert a force within a range of 0.01 to 0.1 Newton on the sample. This is sufficient to drive out surplus liquid without significantly affecting the AFM measurements.

BRIEF DESCRIPTION OF THE DRAWING

These and other objects and advantageous aspects will become apparent from the following description of exemplary embodiments with reference to the following figures.

DETAILED DESCRIPTION OF EXEMPLARY EMBODIMENTS

FIG. 1 shows a cross-section of a sample 10 in a prior art AFM measuring system (not to scale). The AFM measuring system comprises a signal generator 12, an ultrasound transducer 14, a cantilever 16, and a detector 18. Signal generator 12 is coupled to ultrasound transducer 14. Sample 10 is placed on top of ultrasound transducer 14.

A probe tip 160 is located on cantilever 16 at a first end of cantilever 16 and a second end of cantilever 16 is connected to a cantilever holder 162. Cantilever holder 162 keeps cantilever so close to the surface of sample 10 that a force will be exerted between sample 10 and tip 160. Furthermore, a scanning mechanism (not shown) is provided to scan the relative position of probe tip 160 and sample 10 in two directions (or at least in one direction) parallel to the surface of sample 10. The scanning mechanism may be configured to move cantilever holder 162, and it may be viewed as part of cantilever holder 162. The scanning mechanism may comprise piezo actuators and/or electromagnetic actuators for example. Alternatively, the scanning mechanism could be configured e.g. to scan the relative position of probe tip 160 and sample 10 by moving of ultrasound transducer 14 together with sample 10.

Signal generator 12 is configured to generate an amplitude modulated high frequency electronic signal. Ultrasound transducer 14 is configured to convert this signal into mechanical vibrations of a surface of ultrasound transducer 14 that is coupled to sample 10. Although ultrasound transducer 14 is shown as an element without detail, it may be noted that ultrasound transducer 14 may comprise a solid body, e.g. a silicon body or of a same material as the sample, and a body of piezo electric material located on the solid body, the solid body being located between the piezo electric body and sample 10. In this embodiment the electronic signal from signal generator 12 may be used to apply an electric field to the piezo electric body, to generate waves that travel through the solid body to sample 10. Furthermore ultrasound transducer 14 may comprise a housing, e.g. of steel. By way of example the solid body may define a platform (not shown) that forms the top of ultrasound transducer 14, and which is used to transmit ultrasound to sample 10 over part of the bottom surface of sample 10. In an exemplary embodiment the platform has a top surface of 4×4 millimeter.

Detector 18 is configured to detect bending of cantilever 16 (and optionally, or alternatively, displacement of cantilever 16). Detector 18 may be an optical detector, comprising a light source (e.g. a laser) configured to project light on a surface of cantilever 16 and a light sensor configured to measure a position of a light spot due to a reflection of the light from the surface of cantilever 16. This can be used to measure cantilever bending, because cantilever bending changes the direction of the reflection of the light from the light source. Furthermore, detector 18 may comprise an electronic circuit for processing signals from the sensor, e.g. to synchronize detection with modulation from signal generator 12 (e.g. in phase detection or quadrature detection), and derive a measured signal. The light sensor may be an image sensor, with an array of light intensity forming an array of pixels (e.g. a CCD image sensor or an array of photo-diodes), or a spot position detector with e.g. two or four light intensity sensors. Alternatively, or in addition, detector 18 may be configured to detect other properties of the reflected light, such as its phase or Doppler shift, using e.g. an interferometer.

In operation, signal generator 12 generate an amplitude modulated high frequency electronic signal. Ultrasound transducer 14 converts this signal into mechanical vibrations and transmits these vibrations to sample 10. The transmitted vibrations cause amplitude modulated ultrasound waves that travel through sample 10 from a first surface of sample 10, which is coupled to ultrasound transducer to a second surface of sample 10 where probe tip 160 senses forces exerted by the second surface. Preferably, the first and second surface of sample 10 are parallel, opposite surfaces of sample 10. Due to non-linear mixing effects at the contact of probe tip 160 and sample 10 the amplitude modulated ultrasound waves produce a vibration component at a vibration frequency corresponding to the modulation frequency.

Probe tip 160 transmits this vibration component to cantilever 16, and the resulting vibration of cantilever 16 is detected by detector 18. For example a signal that is proportional to the amplitude of the vibration of cantilever 16 may be detected. The relative positions of cantilever 16 and sample 10 is scanned in one or two directions parallel to the surface of sample 10 and the detection of the resulting vibration of cantilever 16 is in a range of these relative positions. Thus the resulting vibration of cantilever 16 is detected for a range of relative positions of cantilever 16 and sample 10. The range may be one or two dimensional. An image of the surface can automatically be formed from the detected vibrations (e.g. of their amplitude) as a function of position, e.g. by a computer (not shown) coupled to detector 18 and to the scanning mechanism of cantilever holder 162, and displayed by an image display device (not shown).

Known measurements of this type provide information about sample surface stiffness, which affects the amplitude of surface vibration in contact with the probe tip. Subsurface structures near the surface affect this surface stiffness. Ultrasound waves with a frequency in the MHz range can be used to observe the surface stiffness. At such frequencies the cantilever acts as a stiff object, making surface stiffness variation detectable from the vibration amplitude. Typically, to measure stiffness, the probe tip is forced towards the sample surface with a force of at least 0.1 micro Newton, usually about one micro Newton.

However, the measured stiffness variation mostly provides information about structures that are relatively close to the surface. Deeper structures cannot be reliably detected from stiffness. However, such deeper structures may affect the effect ultrasound wave scattering. Measurement of scattering effects as a function of position along the surface can be used to form an image with information about deeper structures. At ultrasound wave frequencies in the MHz range stiffness effects, e.g. due to surface inhomogeneity dominate the measurements. But the size of the scattering effects increases with ultrasound wave frequency (typically with the square of the frequency). With ultrasound wave frequencies in the GHz range (at or above 1 GHz, or at least above 0.5 GHz) scattering effects are measurable. To perform such scattering measurements, the force exerted by the probe tip on the sample surface is preferably kept much smaller than the force used for stiffness measurement. Optionally, the change of the AFM measurements form one ultrasound wave frequency to another in the GHz range, or this change as a function of ultrasound wave frequencies in the GHz range, may be used to distinguish the scattering effects.

To observe the effect on scattering it is desirable to use ultrasound with a frequency above 1 GHz and use forces of about one nano Newton (e.g. between 0.1 and 50 nano Newton and more preferably between 0.1 and 10 nano Newton). Preferably, contact mode resonance is used. In contact mode resonance, probe tip 160 is located at a node of a cantilever vibration mode. Given the distance between probe tip 160 and a fixed end of cantilever, a cantilever vibration frequency can be determined at which probe tip 160 is located at the node. By using an ultrasound modulation frequency that is equal to this cantilever vibration frequency, contact mode resonance can be realized.

The higher the ultrasound frequency the deeper and/or more scattering from subsurface structures affects the detection. Measurements with ultrasound wave frequencies in the GHz range i.e. above 1 GHz or at least above 0.5 GHz are needed e.g. at frequencies of 1-2, 1-4 or 1-10 GHz. However, it has been found that such measurements are hard to reproduce. In different experiments wherein the same sample is each time placed on the same ultrasound transducer only a few of the experiments resulted in detectable effects. Most experiments produced no effect or with much lower signal to noise ratio than the best measurements.

The inventors have found that the interface between ultrasound transducer 14 and sample 10 is a critical cause of the lack of reproducibility of the AFM measurements. The use of a conventional viscous coupling medium such as Vaseline between ultrasound transducer 14 and sample 10 results in significant damping in the case of GHz measurements and microscopic changes in the thickness of such a medium results in instability of the detected vibrations of cantilever 16.

Figure 3:
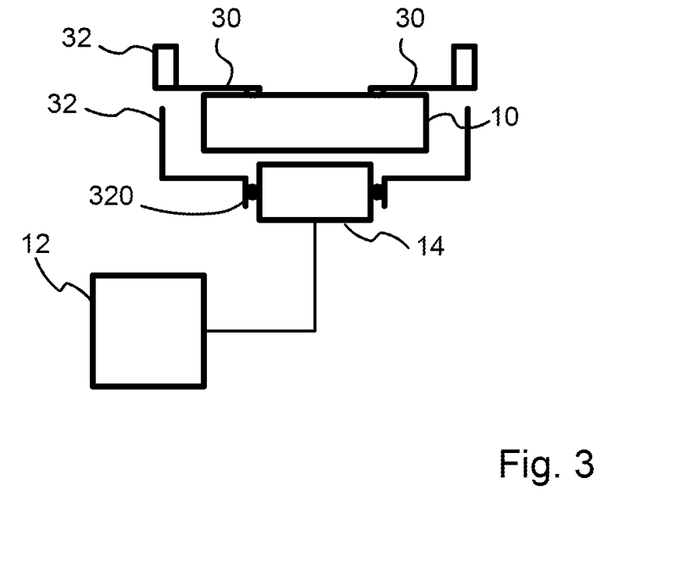
FIG. 3 shows an AFM measuring system
Figure 4:
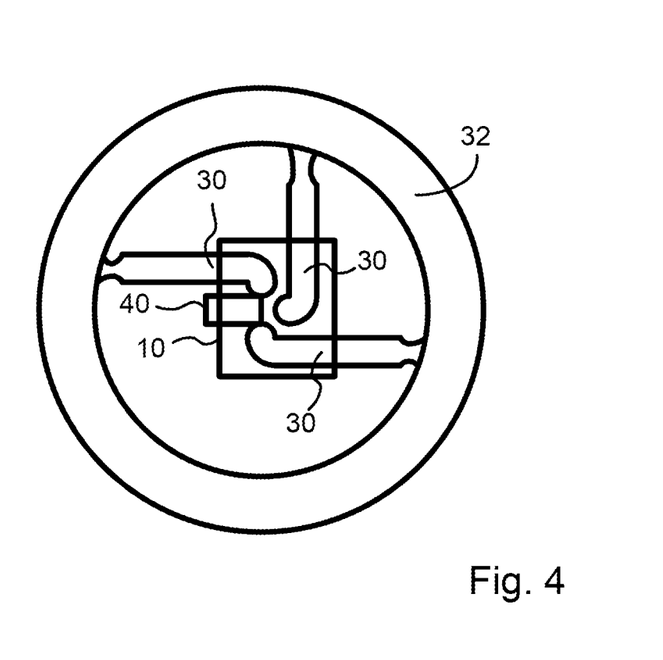
FIG. 4 shows an embodiment with clamps

FIG. 3 shows a cross-section of an embodiment of the AFM measuring system wherein the sensitivity and stability are improved. In addition to the elements shown in FIG. 1, this embodiment comprises clamps 30 and a liquid basin 32. In the illustrated embodiment clamps comprising leaf springs are used and the leaf springs of clamps 30 are all mounted on a shared frame 34. Clamps 30 are configured to exert a force that urges sample 10 and ultrasound transducer 14 towards each other. Although two clamps 30 are visible in the cross-section more may be used. FIG. 4 shows a top view of an embodiment with three clamps 30 and an AFM cantilever holder 40 above sample 10.

Instead of leaf springs other types of clamps may be used, such as suction clamps, electrostatic clamps, electro-wetting clamps or magnetic clamps or clamps with other types of springs. In the case of suction clamps, suction ducts may be provided underneath the sample, sealed off from the liquid e.g. by O-rings.

Liquid basin 32 has a wall that surrounds ultrasound transducer 14. The height h of the upper edge of the wall of liquid basin 32 will be referred to as "h". The height h is at least so high that a top level of liquid in liquid basin 32 lies above the top surface of ultrasound transducer 14, when liquid basin 32 is fully filled. That is h>h1, wherein h1 is a height of the wall so that a top level of liquid in liquid basin 32 is even with above the top surface of ultrasound transducer 14, when liquid basin 32 is fully filled (due to liquid surface curvature at the wall, the height h1 may be slightly higher than the top surface of ultrasound transducer 14 if the liquid is water, or lower if it is mercury).

Preferably, the upper edge of the wall of liquid basin 32 is lower than a height h2 that is so high that the top level of liquid in liquid basin 32 is level with the top surface of sample 10, when liquid basin 32 is fully filled. In the illustrated embodiment, the bottom of liquid basin 32 is formed by an O-ring 320 between the wall of liquid basin 32 and a vertical part of ultrasound transducer 14 below the top surface of ultrasound transducer 14.

In the illustrated embodiment, each clamp 30 comprises a leaf spring and contact body 300 at the tip of the leave spring. In use, only the contact body contacts sample 10. Preferably the contact body has a spherically shaped surface, at least at and surrounding its lowest point, where the contact body 300 contacts sample 10, up to a distance from that lowest point at which the level of the surface with respect to the lowest point is higher than the unevenness of the surface of the sample (e.g. ten micron higher). This minimizes lateral forces when contact body 300 moves along the sample surface. Instead another rounded shape may be used, e.g. with different radii of curvature in different directions from the clamp-sample contact point.

In the illustrated embodiment of FIG. 4, each leaf spring has a hooked shape, with a part at the tip of the leaf spring extending beyond an extrapolation of the edge of the remainder of the leaf spring, in the direction to the AFM cantilever. This makes it possible to place contact body 300 closer to the AFM cantilever in the case of a small top surface of ultrasound transducer 14, while avoiding interference between AFM cantilever holder 40 and the remainder of the clamp 30.

Preferably, within positioning errors of the clamps, the cantilever tip lies mirror symmetrically with respect to the clamp-sample contact points (so that each contact point that does not lie on the central axis of the cantilever has a counterpart at a further position that is mirror symmetric with respect to the central axis to the position of the contact point). In the illustrated example, the cantilever tip is midway between the contact points of the contact bodies 300 of two of clamps 30 and the contact point of the contact body 300 of the third clamps 30 is at the same distance to the cantilever tip, in a direction perpendicular to the connecting line between the contact points of the other clamps. This improves temperature stability of cantilever measurements. Within positioning errors of the clamps, the position of the cantilever can be taken as the position of its probe tip.

In the illustrated embodiment the leaf springs of clamps 30 are all mounted on a shared frame 34. In use, frame 34 is mechanically directly or indirectly coupled to ultrasound transducer 14. An elastic guidance connection may be used between frame 34 and a further structure that supports ultrasound transducer 14. Elastic guidance connection may comprise a number of leaf springs (e.g. three), emanating tangentially from frame at regularly spaced angle differences. This may be used to limit the lateral motion when frame is moved up or down. Two layers of such elastic guidance connection may be used at different heights. An actuator or actuators, such as adjustment screws, may be used to adjust the vertical position of frame 34.

Preferably, the maximum distance between the clamp-sample contact points of the mounted clamps are smaller than the diameter of the top surface of ultrasound transducer 14 in the corresponding direction. Thus all clamps can be simultaneously located vertically above the top surface of ultrasound transducer 14 on which sample 10 rests. This avoids bending forces on sample 10.

Prior to measurement, it is ensured that the top surface of ultrasound transducer 14 and the surface of sample are smoothed, cleaned and fat free. At the start of an exemplary measurement procedure, first a drop of (preferably demineralized (e.g. distilled)) water is placed on the top surface of ultrasound transducer 14, at a time when liquid basin 32 is empty, or at least so little filled that the liquid (water) in liquid basin 32 does not reach the level of the top surface of ultrasound transducer 14. The drop need not fully cover the top surface of ultrasound transducer 14. The drop volume should be sufficient to fill a one micrometer layer over the entire top surface of ultrasound transducer 14. Volumes of 0.1-10 microliter (0.1-10 $10^{-9}$ cubic meter) produced the best result. A larger volume is possible, but increases the waiting time before the AFM measurements can start.

Next, sample 10 is placed on the top surface of ultrasound transducer 14. Preferably, this is done immediately after the drop has been placed, and at least before the drop has fully evaporated. Subsequently, clamps 30 are placed on sample 10 and frame 34 is set to a position wherein clamps 30 force sample towards the top surface of ultrasound transducer 14. Preferably a force of at least 0.01 N per clamp is used. On average, some more force may be needed to compensate for force differences between the clamps. The clamp is configured to exert a force within a range of 0.01 to 0.1 Newton on the sample.

The force has the effect of speeding up reduction of the thickness of the drop of water and spreading the water on and from top surface of ultrasound transducer 14. Even under constant pressure of the force, the thickness reduction progresses as a function of time: it does not occur all at once. With time the water layer thickness will drop until it cannot drop further due to surface roughness of sample 10 and the top surface of ultrasound transducer 14. Usually this results in an average water layer thickness of one micrometer or less (averaged over the common area of the top surface of the transducer and the bottom surface of the sample). It may be noted that, due to surface roughness, there may be local variations in the distance between the sample and the ultrasound transducer, and that at some places the sample and the ultrasound transducer may be in direct contact. As used herein, the term liquid layer (e.g. water layer) refers to the liquid present between sample and the ultrasound transducer, irrespective of whether there are locations of direct contact where the layer is absent. The term liquid layer thickness refers to the average thickness of the layer, i.e. the volume of liquid divided by its area.

After a waiting time, the liquid basin 32 is filled and the AFM measurements are started. Optionally, a step of selecting a ultrasound wave frequency or frequencies is performed before the actual AFM measurements are started using the selected ultrasound wave frequency or frequencies. This may be done by measuring out of surface displacement of the top surface of the sample as a function of frequency, and selecting a frequency of a (local or global) maximum of displacement as a function of frequency within an intended measurement frequency range, or selecting respective frequencies of maximum displacement within a plurality of intended frequency ranges.

Although the invention is not limited by any theory of operation, it may be assumed that the effect arises as follows. A small force exerted on the sample is sufficient to cause the sample and the transducer to reach mechanical contact where their distance becomes minimal due to roughness of the sample and/or the transducer. The contacts ensure position stability. A force of 0.01 to 0.1 Newton may be used. An upper bound on the force size is that force should be below a force level at which plastic deformation of the sample occurs. Below that force level, the force size is mainly relevant for the time delay before vertical position stability is reached. The lower bound on the force size depends on what is acceptable as a time delay.

An alternative way to ensure a stable position would be to hold the upper and lower surface along the edge of the sample fixed between clamps. However, this would result in a significantly larger positioning loop, which is harder to keep stable.

Although the contacts due to roughness ensure vertical position stability, they leave space between the transducer and the sample where there is no contact, partly due to the roughness, but mainly due to residual curvature (bow warp) of the sample surface, e.g. the back surface of a semiconductor wafer. Typically, the roughness of the sample and the transducer is in the order of ra=0.1 micrometer (standard deviation of surface height) and bow warp may be 0.1 micrometer per millimeter.

Liquid is used to "fill" this space between the transducer and the sample in order to ensure ultrasound coupling. Typically the required liquid volume corresponds to a volume of a layer with the area of the sample-transducer contact and an average thickness of less than 2 micrometer (e.g. 0.5 micrometer or less).

Figure 2:
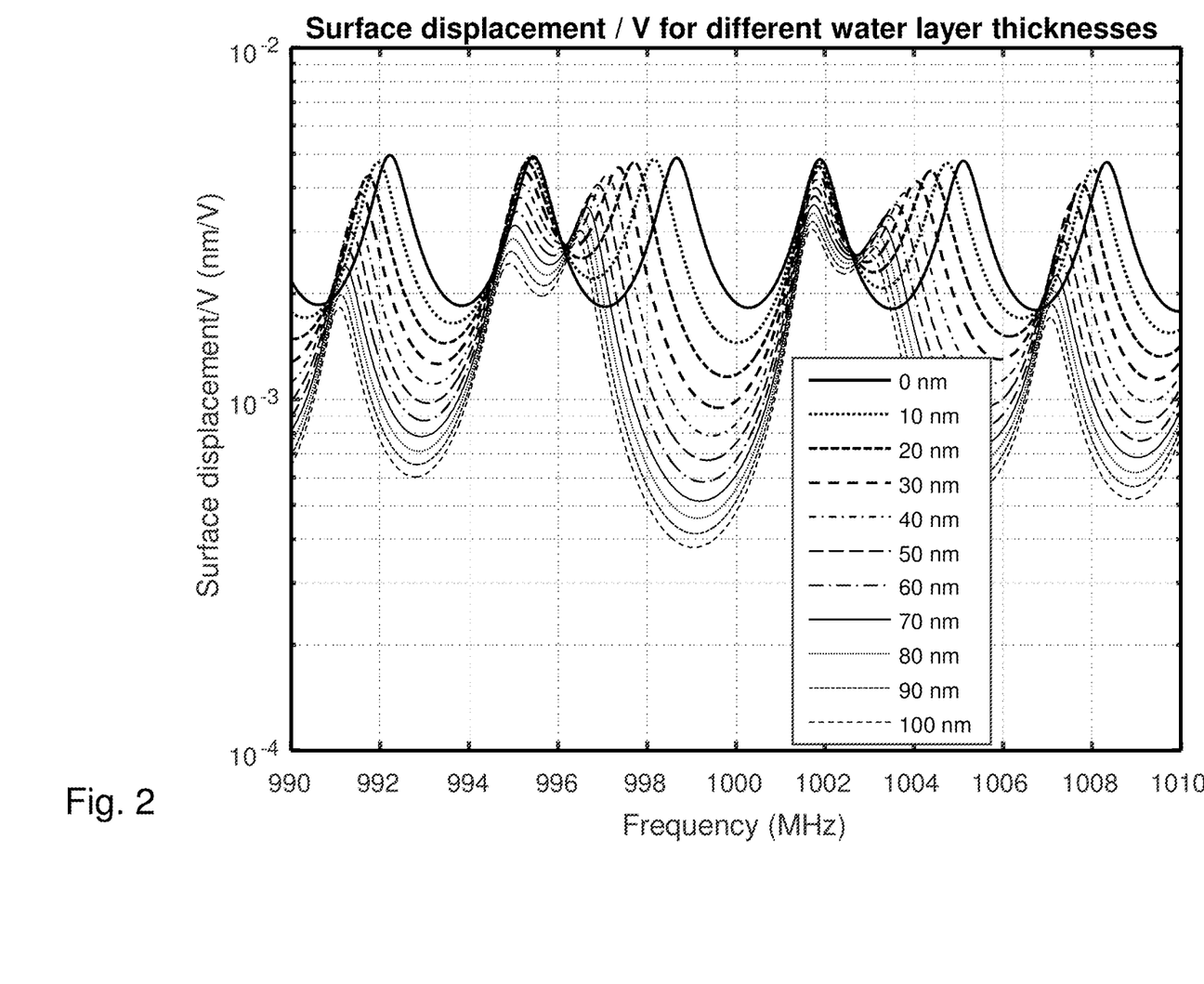
FIG. 2 illustrates measurement instability

FIG. 2 shows an exemplary out of surface displacement of the top surface of the sample at frequencies near 1 GHz. The out of surface displacement of the top surface of the sample may be measured by means of AFM measurements with the probe tip at a single location on the surface, or as an average of surface displacement measurements at a plurality of locations. Due to resonances e.g. in the ultrasound transducer, the liquid layer and the sample the out of surface displacement may vary as a function of ultrasound wave frequency, with many local maxima and minima. The frequency selection selects one such maximum, preferably the maximum with the largest out of surface displacement.

The waiting time is used to ensure that the thickness of the water layer between ultrasound transducer 14 and sample 10 is reduced to one micrometer or less. Preferably, this is measured using reflection measurements by ultrasound transducer 14. The interfaces of the water layer with the top surface of ultrasound transducer 14 and sample 10 cause ultrasound reflections with a slight delay. Therefore the decrease of the thickness of the water layer may be monitored using pulse echo measurements or resonance peak position measurements, and the measurements may be started once these measurements show a stable response. However, instead of using measurements a predetermined waiting time of e.g. 1 minute or 2 minutes may be used.

In practice the waiting time is usually 10-40 seconds, dependent on the volume of the drop (increasing with increasing volume). After the waiting time, the liquid basin 32 is filled with water and the AFM measurements are started. The water in liquid basin 32 is present at the level of the water layer between the top surface of ultrasound transducer 14 and sample 10, which prevents, or at least significantly slows down, further reduction of the thickness of the water layer. This provides for transmission of ultrasound waves from ultrasound transducer 14 through sample 10 via a water layer of effectively stable thickness during the AFM measurements. Moreover, a thickness of less than one micrometer limits attenuation of ultrasound transmission through the water layer to levels at which sufficiently sensitive AFM measurements are possible.

Alternatively, the basin may be filled to a level above the level of the top surface of ultrasound transducer 14, e.g. to less than 0.01 or 0.1 mm above the top surface, before the sample is placed on ultrasound transducer 14 and subsequently pressing the sample on the top surface of ultrasound transducer 14. In this case, with more height in the basin more time will be needed before a stable thickness is reached.

Filling the basin only after the stable thickness of the layer has been reached has the advantage that the stable thickness is reached faster, so that the measurements can start sooner. The basin is used to extend the measuring time by preventing evaporation of the liquid between the sample and the ultrasound transducer, so as to keep the distance between the bottom surface of the sample and the top surface of the ultrasound transducer constant. Even without liquid in the basin the liquid will not evaporate immediately. If this provides for sufficient measuring time without liquid in the basin, an embodiment may be used wherein the basin is omitted.

Preferably the AFM measurements are configured to detect the effect on scattering, using an ultrasound frequency above 1 GHz and forces of about one nano Newton exerted by the AFM probe tip (e.g. between 0.1 and 50 nano Newton) and a contact mode resonance is used.

Although a preferred embodiment using water has been described, it should be noted that another liquids, such as an alcohol, paraffin or mercury, may be used instead. Water is preferred over alcohol because it evaporates more slowly, and use of mercury may require more precautions due to its toxicity.

The clamps are used to shorten the waiting time before the stable thickness of the water layer is reached. When the waiting time without the clamps is acceptable, an embodiment may be used wherein they are omitted. The clamp force is not needed after the stable layer thickness has been reached. In an embodiment the clamp force may be removed after the stable layer thickness has been reached.

If the measuring time is still too short due to evaporation of liquid from the basin, further measures may be taken. The AFM measuring system may comprise means (not shown) for replenishing the basin during the measurements (preferably between successive measurements of the vibrations of the cantilever at different positions of the cantilever relative to the sample). Such means for replenishing the basin may comprise a reservoir for the liquid, a conduit from the reservoir to the basin and a valve for controllably blocking and permitting liquid flow through the conduit. Optionally a liquid level sensor may be provided, for sensing the liquid level in the basin. The means for replenishing the basin may be used to keep the liquid level between the top surfaces of the sample and the ultrasound transducer. This can be used to extend the measuring time by preventing evaporation of the liquid between the sample and the ultrasound transducer. Preferably, the liquid level in the basins is kept substantially constant, e.g. by using a feedback loop to control replenishing. This minimizes changes in the forces on the sample.

In an embodiment the AFM measuring system comprises a temperature control system. In a further embodiment the temperature control system may be used to reduce the temperature of the liquid below its solidification temperature. This can be used to extend the measuring time by reducing evaporation of the liquid between the sample and the ultrasound transducer by solidification of the liquid. The temperature of the sample and the ultrasound transducer may be cooled together with the liquid.

Alternatively, the sample and the ultrasound transducer may be heated temporarily to ensure that the liquid does not solidify when it is supplied, and the heating may be removed or reduced after a desired liquid layer thickness has been reached, to ensure solidification. E.g. paraffin or optical wax may be heated to act as the liquid in the illustrated embodiments, and heating may be removed or reduced to solidify the paraffin or wax. If the solidification per se provides a sufficient performance increase, an embodiment may be used wherein clamping is omitted.

The invention claimed is:

1. A method of performing atomic force microscopy (AFM) measurements, the method comprising
   providing an ultrasound transducer;
   placing a drop of a liquid on a top surface of the ultrasound transducer;
   placing a sample on the top surface of the ultrasound transducer, whereby the sample presses the liquid in the drop into a layer of the liquid between the top surface of the ultrasound transducer and a bottom surface of the sample;
   providing a basin for said liquid, the top surface of the ultrasound transducer being located within the basin, wherein the basin is empty or a surface level of the liquid in the basin is below the top surface of the ultrasound transducer during the steps of placing the drop of liquid and placing the sample on the top surface of the ultrasound transducer;
   transmitting modulated ultrasound waves from the ultrasound transducer to a top surface of the sample through the sample from the bottom surface of the sample to the top surface of the sample;
   filling the basin with the liquid after the thickness of the layer of the liquid has stabilized, thereby raising the surface level of the liquid in the basin above the top surface of ultrasound transducer; and
   performing measurements of vibrations of a cantilever excited by the modulated ultrasound waves while a probe tip on the cantilever is in contact with the top surface of the sample, after a thickness of the layer of the liquid has stabilized.

2. The method according to claim 1, wherein a volume of the drop that is placed on the top surface of the ultrasound transducer, divided by a contact area between the sample and the ultrasound transducer is less than half a micrometer.

3. The method according to claim 1, wherein the surface level of the liquid is kept below the top surface of the sample and the bottom surface of the sample is below the surface level of the liquid after said filling.

4. The method according to claim 1, the method further comprising replenishing the liquid in the basin between successive ones of the measurements.

5. The method according to claim 1, wherein a volume of the drop that is placed on the top surface of the ultrasound transducer, divided by a contact area between the sample and the ultrasound transducer is less than two micrometer.

6. The method according to claim 1, the method comprising clamping the bottom surface of the sample and the top surface of the ultrasound transducer against each other, thereby exerting a pressing force on the liquid in the layer of the liquid between the bottom surface of the sample and the top surface of the ultrasound transducer, at least until the thickness of the layer of the liquid has stabilized.

7. The method according to claim 6, wherein the clamping is performed by at least one of exerting the pressing force onto the top surface of the sample using at least one spring, applying suction to the bottom surface of the sample, electrostatic clamping, magnetic clamping and electro-wetting.

8. The method according to claim 1, further comprising:
performing ultrasound reflection measurements using the ultrasound transducer after the sample has been placed on the top surface of the ultrasound transducer;
monitoring changes in results of the reflection; and
starting the measurements of vibrations of the cantilever upon detection that results of the reflection measurements indicate that the thickness of the layer of the liquid has stabilized.

9. The method according to claim 1, wherein the liquid is water, paraffin, alcohol, liquefied wax, mercury, a gallium-alloy, an adhesive, or solder tin.

10. The method according to claim 1, further comprising lowering a temperature of the liquid below a solidification temperature of the liquid after the thickness of the layer of the liquid has stabilized.

11. An AFM measuring system, comprising:
an ultrasound transducer;
a basin for a liquid, a top surface of the ultrasound transducer being located within the basin, an upper edge of a wall of the basin lying so high that, when the basin is filled, a surface level of the liquid in the basin lies above the top surface of the ultrasound transducer;
an AFM cantilever located above the top surface of the ultrasound transducer, for contacting a top surface of a sample between the AFM cantilever and the top surface of the ultrasound transducer;
a detector configured to detect bending of the AFM cantilever; and
a first elastically deformable clamp configured to be placed in contact with the top surface of the sample and press the top surface of the sample elastically towards the top surface of the ultrasound transducer.

12. The system according to claim 11, the wherein the first elastically deformable clamp is configured to be placed in contact with the top surface of the sample over the basin, and wherein the top surface of the sample is pressed elastically towards the top surface of the ultrasound transducer into the basin.

13. The system according to claim 11, wherein the first elastically deformable clamp comprises a first leaf spring, the system further comprising a frame, to which the first elastically deformable leaf spring is connected, and at least a second elastically deformable clamp comprising a second leaf spring connected to the frame, the at least one second elastically deformable clamp also being configured to be placed in contact with the top surface of the sample and to press the top surface of the sample elastically towards the top surface of the ultrasound transducer.

14. The system according to claim 12, wherein the first elastically deformable clamp and the at least second elastically deformable clamp are placed in contact with the top surface of the sample at equal distances to the cantilever, at contact points that lie mirror symmetrically with respect to the cantilever.

15. The system according to claim 12, wherein the first elastically deformable clamp is configured to exert a force within a range of 0.01 to 0.1 Newton on the sample.

16. The system according to claim 11, wherein the first elastically deformable clamp comprises a contact body, a lowest part of the contact body having a rounded shape for contact with the sample.

17. The system according to claim 11, further comprising the sample, wherein the sample rests on, or is pressed against the top surface of the ultrasound transducer within the basin, with the top surface of the ultrasound transducer and a bottom surface of the sample within the basin and a top surface of the sample above the basin.

18. An AFM measuring system, comprising:
an ultrasound transducer;
a basin for a liquid, a top surface of the ultrasound transducer being located within the basin, an upper edge of a wall of the basin lying so high that, when the basin is filled, a surface level of the liquid in the basin lies above the top surface of the ultrasound transducer;
an AFM cantilever located above the top surface of the ultrasound transducer, for contacting a top surface of a sample between the AFM cantilever and the top surface of the ultrasound transducer;
a detector configured to detect bending of the AFM cantilever; and
a first elastically deformable clamp,
wherein the ultrasound transducer performs ultrasound reflection measurements after the sample has been placed on the top surface of the ultrasound transducer, wherein changes in results of the reflection measurements are monitored, and wherein, when the changes in results of the reflection measurements indicate that the thickness of the layer of the liquid has stabilized, measurements of vibrations of the cantilever are started.

* * * * *